June 7, 1932. P. P. CHAPIN ET AL 1,862,330
AUTOMATICALLY REFRIGERATING RECEPTACLE
Filed May 31, 1928
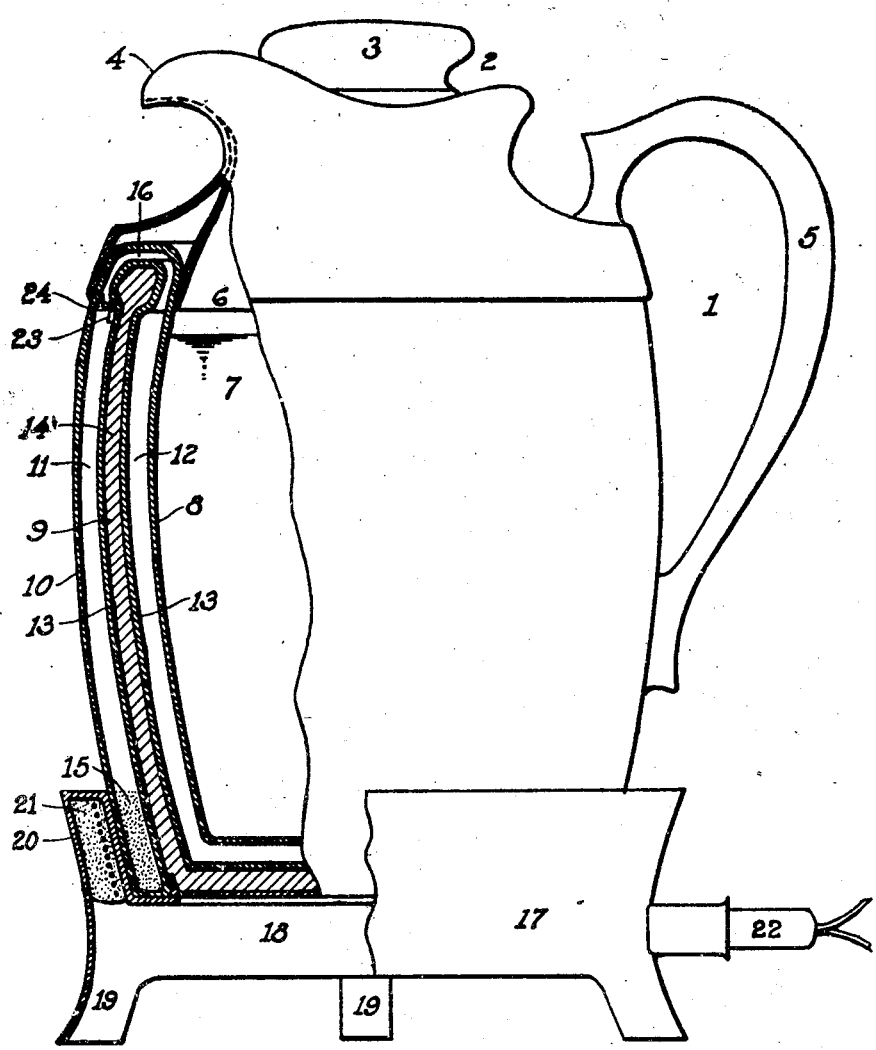

Patented June 7, 1932

1,862,330

UNITED STATES PATENT OFFICE

PHILIP P. CHAPIN AND WILLIAM J. KUPEC, OF NEW YORK, N. Y.

AUTOMATICALLY REFRIGERATING RECEPTACLE

Application filed May 31, 1928. Serial No. 281,759.

This invention relates to refrigeration, and its principal object is to provide a receptacle which will automatically and directly cool or refrigerate the liquid or other substance which is to be consumed or utilized at the reduced temperature.

In carrying out the invention resort is had to the well known principle which involves a liquefying gas and chamber therefor, a gas absorbent and chamber therefor which is in communication with said former chamber, provision for removable heating means for the absorbent, and provision for cooling the liquefying gas. In the embodiment of this invention the receptacle for the substance which is actually to be consumed or utilized is directly enveloped by the liquefying chamber of the process while the latter chamber is in turn directly enveloped by the gas absorbent chamber of the process.

Other objects and advantages will hereinafter appear.

The accompanying drawing shows an elevation, partly in cross-section and partly in full, of the receptacle constituting the invention.

As here shown, the receptacle 1 is formed as an ordinary pitcher or jug having the usual mouth 2, stopper 3, spout 4, and handle 5. The inner chamber 6 of the receptacle holds the utilizable liquid 7 to be refrigerated or cooled, such as beverages, etc., and the wall 8 of this chamber is enveloped by a heat-insulated wall 9, which is in turn enveloped by the exterior wall 10 of the receptacle. The disposition of the walls 9, 10 is such that they form spaces, receptacles, or chambers 11, 12, the latter of which envelops the wall 8 or chamber 6 and the former of which envelops the insulation wall 9, or may be said to envelop the chamber 12. As here shown, the wall 9 consists of a double layer of plates 13 between which is filled any suitable heat insulation material 14, such as asbestos. In the chamber or receptacle 11 is located a gas absorbent 15, such as water or, as here shown, charcoal, or any other suitable substance may be utilized which under ordinary temperatures will efficiently absorb ammonia or any other liquefying gas that may be suitable for this type of refrigeration process. The chambers or receptacles 11, 12 are in communication with each other through a passage-way 16. The receptacle or jug 1 is seated in a heating stand 17, comprising a platform 18, supporting legs 19, and a double wall 20, which surrounds the lower portion of the exterior wall 10 of the jug and carries an electric heater unit 21, the conducting cable 22 of which may be plugged into any convenient feed socket, not shown.

When it is desired to refrigerate or cool the contents 7 of the jug 1, water is first poured into a chamber 6 and the current is turned on to the heater 21, and the heat, penetrating the wall 10 to the absorbent 15, then frees the ammonia, which enters through passageway 16 into the chamber or receptacle 12 and is, after reaching a certain pressure, therein liquefied, by virtue of this chamber being cooled by the said water retained in the chamber 6. Thereupon the current may be shut off, the jug removed from the stand 17, the water poured out, and the utilizable contents 7 inserted into the chamber 6, to thereby quickly remove the heat from the absorbent 15, which sharply lowers the gas pressure and causes the rapid evaporation of the liquefied ammonia in the chamber 12, producing in turn the consequent rapid and efficient cooling or refrigeration of the utilizable liquid contents 7. Incidentally the ammonia is reabsorbed by the charcoal 15, and the normal condition of the entire receptacle 1 is then restored, ready for a repetition of the same process.

The jug 1 may be adapted for use in connection with a gas heater, instead of the electric heater here shown. In case aqueous ammonia or similar liquid gas-absorbent should be utilized, the passageway 16 may be provided with a check-valve 23, hinged at 24, which permits the free passage of the gases between the chambers 11, 12, but operates to preclude the exit of any of the aqueous ammonia from its chamber 11, when the jug is inverted for pouring out the water or the contents, or for cleaning purposes. Any of the well known cut-off devices and safety valves may be installed on this receptacle for shutting off at a predetermined time the current or illuminating gas, or preventing excess gas-pressure developing in the chambers 11, 12.

It will be evident that this device is simple, inexpensive, conveniently and economically manufacturable, conveniently and economically utilizable, and well appearing. It will be also evident that after the contents of this jug have been refrigerated they will continue to be retained at a low temperature for a long time, due to the chamber 6 being enveloped by the insulation wall 9 and the intervening chambers 11, 12, which also conduce to the insulation of the contents.

Variations may be resorted to within the scope of the invention, and portions of the improvements may be used without others.

Having thus described our invention, we claim:—

1. The combination of a receptacle for the utilizable substance, a gas liquefying receptacle enveloping said receptacle, an insulating wall enveloping said gas liquefying receptacle, a gas absorbent receptacle enveloping said wall, and said last two receptacles being in communication with each other.

2. The combination of a receptacle for the utilizable substance, a gas liquefying receptacle enveloping said receptacle, an insulating wall enveloping said gas liquefying receptacle, a gas absorbent receptacle enveloping said wall and being in communication with said gas liquefying receptacle, and means to apply heat to said gas absorbent receptacle.

3. The combination of a receptacle for the utilizable substance, a gas liquefying receptacle enveloping said receptacle, an insulating wall enveloping said gas liquefying receptacle, a gas absorbent receptacle enveloping said wall and being in communication with said gas liquefying receptacle, and a heater surrounding the lower part of said gas absorbent receptacle.

Signed at the city of New York, in the county of New York, and State of New York, this 26th day of May, A. D. 1928.

PHILIP P. CHAPIN.
WILLIAM J. KUPEC.